United States Patent [19]

Nickerson et al.

[11] 3,727,011

[45] Apr. 10, 1973

[54] SIGNAL CONDITIONER FOR IMPROVED UTILIZATION OF RECORDING RANGE OF UNBIASED MAGNETIC TAPE

[75] Inventors: Clive L. Nickerson, Ashland; Leslie A. McClaine, Wellesley Hills, both of Mass.

[73] Assignee: The United States of America as represented by the Secretary of the Army

[22] Filed: June 16, 1971

[21] Appl. No.: 153,652

[52] U.S. Cl. ...179/100.2 K, 340/174.1 G, 346/74 M

[51] Int. Cl. ............................G11b 5/02, G11b 5/44

[58] Field of Search.................179/100.2 R, 100.2 B, 179/100.41 V, 100.2 K, 100.41 P; 73/DIG. 4; 330/69, 150, 28; 324/34 TA, 43 R, 112; 340/174.1 G, 174.1 B, 191; 346/74 M

[56] References Cited

UNITED STATES PATENTS

| | | | |
|---|---|---|---|
| 3,058,113 | 10/1962 | Wilson | 346/74 M |
| 2,868,890 | 1/1959 | Camras | 179/100.2 K |
| 3,365,593 | 1/1968 | Roof et al. | 73/DIG. 4 |
| 2,963,911 | 12/1960 | Courtney-Pratt | 179/100.41 V |
| 3,217,329 | 11/1965 | Gabor | 346/74 M |
| 3,280,270 | 10/1966 | Allington | 179/100.2 R |

*Primary Examiner*—Bernard Konick
*Assistant Examiner*—Alfred H. Eddleman
*Attorney*—Harry M. Saragovitz et al.

[57] ABSTRACT

An electronic signal conditioner that supplies magnetic recording head current that is a non-linear function of the input signal to be recorded and wherein extended linear dynamic range of a magnetic tape recording system is realized by utilizing the input-output characteristic of the conditioner to compensate for the non-linear behavior of unbiased magnetic tapes.

8 Claims, 2 Drawing Figures

INVENTORS
Clive L. Nickerson
Leslie A. McClaine
BY: Harry M. Saragovitz,
Edward J. Kelly &
Herbert Berl
ATTORNEYS.

SIGNAL CONDITIONER FOR IMPROVED UTILIZATION OF RECORDING RANGE OF UNBIASED MAGNETIC TAPE

The invention relates to magnetic tape recording systems and more particularly, to the use of signal conditioning means to compensate for the non-linear behavior of unbiased magnetic tape in such systems.

The recording characteristics of unbiased magnetic tape are inherently non-linear. For this reason, most magnetic tape recording techniques use only a portion of the total signal recording range of the tape, operating only on that portion of the recording range of the tape which gives a linear input-output response. One method of extending the linear response range of the tape involves using a recording head with a very small gap, for example, 0.1 mil. However, the use of such a recording head has the disadvantage of significantly increasing amplitude errors in the tape read-out. On the other hand, a 0.5 mil. gapped recording head reduces such amplitude errors but increases non-linearity of the input-output curve, reducing the portion of the recording range of the tape which may be used when a linear input-output characteristic is required.

The present invention makes it possible to use the full recording range of the magnetic tape while providing a substantial linear input-output characteristic over the full range by amplifying the input signals by differing amounts using several stages of linear amplification. By correlating the stages of amplification with the recording characteristics of the tape, a generally linear relationship is achieved between the input signals and the tape read-out. The signal applied to the recording head is a non-linear function of the input signal that compensates for the non-liner behavior of the unbiased magnetic tape thereby extending the linear dynamic range of the recording system.

It has also been found that the dynamic range of the recording tape can be improved approximately 1.5 times by premagnetization of the tape to saturation. However, bipolar recording is thus rendered impossible making rectification of all input signals essential.

It is, therefore, an object of the invention to provide signal conditioning means for use with a magnetic tape recorder which will permit utilization of the full recording range of unbiased magnetic tape while maintaining a substantially linear input-output characteristic of the recording system.

Another object of the invention is to provide an electronic signal conditioner for use in a shipping container shock recording system to couple a piezoelectric accelerometer with a magnetic tape recorder to supply magnetic recording head current thereto that is a non-linear function of the charge generated by the accelerometer.

The novel features that are considered characteristic of the invention are set forth with particularity in the appended claims. The invention itself, however, both as to its organization and method of operation and advantages thereof will be best understood from the following description of one embodiment thereof when read in connection with the drawing in which:

Figures 1, 2:
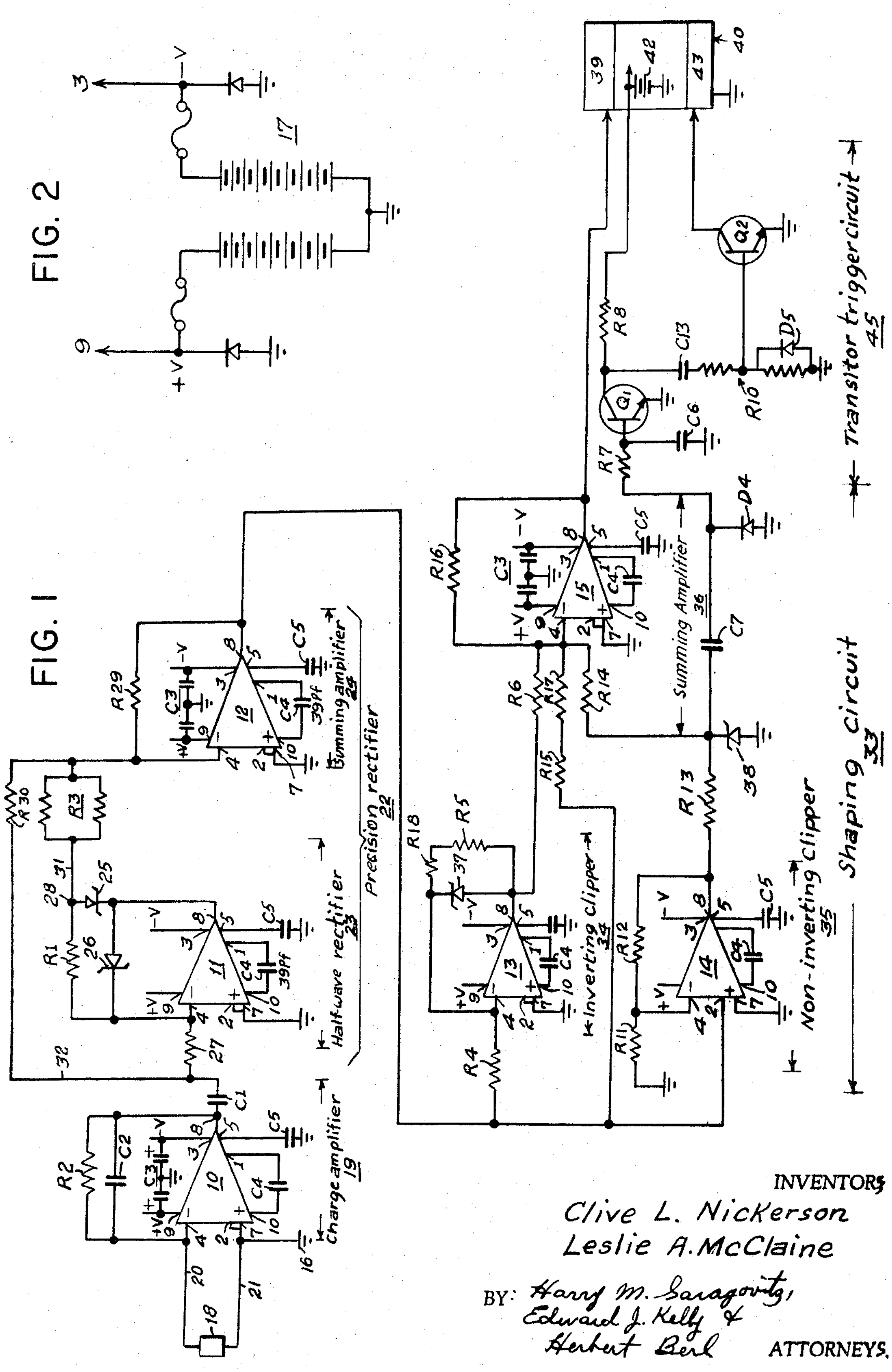
FIG. 1 is a schematic diagram of the signal conditioner circuit.
FIG. 2 is a symbolic showing of the power supply as it would be applied across each of the terminals of the amplifiers in FIG. 1.

The integrated operational amplifier units 10–15 employed in the invention are each identified as National Semiconductor NH0001 and are hereinafter referred to as operational amplifiers, it being understood that they are provided with feedback and input impedances as shown in the schematic diagram. The numerical references identifying the various terminals thereof are the same as employed by the manufacturer. Operational amplifiers 10, 12 and 15 have series connected capacitors C3 coupled between terminals 9 and 3 with the junction thereof returned to common circuit 16, serving as power supply 17 bypass elements. Each operational amplifier 10–15 has a capacitor C4 connected between its terminals 1 and 10 and a capacitor C5 connected between terminal 5 and the common circuit 16 both of which function as operational amplifier compensation elements.

A piezoelectric accelerometer 18 is coupled to the input terminals 4 and 7 of charge amplifier 19 by means of conductors 20 and 21. The charge amplifier 19 consists of operational amplifier 10 provided with a capacitor C2 coupled between its input and output which determines the amplifier gain and a resistor R2 also coupled between said input and output sustains the feedback leakage. The charge amplifier 19 in response to the charge developed by the piezoelectric accelerometer 18 produces a voltage pulse at its output equal to the charge input to the amplifier divided by the value of capacitor C2. The output of charge amplifier 19 is coupled to precision rectifier 22 which consists of half-wave rectifier 23 coupled to summing amplifier 24. Specifics concerning the operating functions of precision rectifier 22 are disclosed in a publication entitled "Application Manual for Operational Amplifiers" published by Philbrick-Nexus Research, Boston, Massachusetts. The half-wave rectifier 23 consists of operational amplifier 11 and a pair of rectifying diodes 25 and 26 connected in parallel in opposite conducting directions to each other between the output and input of amplifier 11 with feedback resistor R1 being in series with diode 25. The voltage pulses produced at the output of charge amplifier 19 are coupled to half-wave rectifier 23 by means of coupling capacitor C1 which couples said output pulses to input resistor 27 of operational amplifier 11. Half-wave rectifier 23 inverts the positive pulses and blocks the negative pulses coupled thereto. The inverted positive pulses of half-wave rectifier 23 are coupled from the junction 28 formed by the series connected rectifying diode 27 and feedback resistor R1 by conductor means 31 to input resistor network R3 of operational amplifier 12 which comprises summing amplifier 24. Resistor R29 connected between the output and the input of amplifier 12 comprises the feedback means.

The voltage pulses at the output of charge amplifier 19 are also coupled by capacitor C1 by means of conductor 32 to a second input resistor R30 of summing amplifier 24. Thus, the sum of charge amplifier 19 output voltage plus twice the half-wave rectifier 23 output voltage is summed and inverted by summing amplifier 24 resulting in a positive voltage pulse in the output thereof, the rectified output of charge amplifier 19, equivalent to the absolute value of the charge amplifier 19 output voltage. The positive voltage pulse equivalent to the absolute value of the charge amplifier 19 output voltage pulse is coupled to a shaping circuit 33 wherein it is processed resulting in the output thereof being the output of the signal conditioner producing a current in the magnetic recording head coupled thereto that is a non-linear function of the charge generated by the piezoelectric accelerometer 18 whereby extended dynamic range of the magnetic tape is realized.

The shaping circuit 33 consists of an inverting clipper 34; a non-inverting clipper 35 and a summing amplifier 36. The inverting clipper 34 comprises operational amplifier 13 wherein series connected resistors R5 and R18 between the input and output of operational amplifier 13 form the feedback means therefor and resistor R4 which forms the input resistor therefor is coupled to the output of summing amplifier 24. Clipping of the operational amplifier 13 output of inverting clipper 34 is obtained by means of Zener diode 37 connected between the output and input of operational amplifier 13. The non-inverting clipper 35 comprises operational amplifier 14 wherein resistor R12 connected between the input and output thereof forms the feedback means and resistor R11 coupled between one input thereof and common circuit 16 forms the input resistor therefor. Clipping of the operational amplifier 14 output of non-inverting clipper 35 is obtained by means of Zener diode 38 connected between the output of operational amplifier 14 and the common circuit 16 through the isolating resistor R13 in series therewith.

Summing amplifier 36 comprises operational amplifier 15 provided with feedback resistor R16 coupling its output and input and three input resistors comprising resistors R6, R15 in series with R17, and R14. The clipped inverted output of inverting clipper 34 is coupled to input resistor R6; the clipped non-inverted output of clipper 35 is coupled to input resistor R14; and the positive going pulse output of summing amplifier 24 coupled to input resistor formed by the series connected resistors R15 and R17 whereby the said three outputs are applied to and summed in summing amplifier 36 resulting in a voltage pulse at the output thereof which is coupled to the magnetic recording head 39 of magnetic recorder 40 producing a current therein that is a non-linear function of the charge generated by the piezoelectric accelerometer whereby extended dynamic range of the magnetic tape of recorder 40 is realized. Simultaneously, with the output of summing amplifier 36, the positive going output pulse of the non-inverting clipper 35 is A. C. coupled to a transistor trigger circuit 45 for magnetic tape recorder 40 on the trailing edge of said positive going pulse.

The transistor trigger circuit 45 employs two transistors identified as $Q_1$ and $Q_2$. Transistor $Q_1$ has the base thereof coupled through current limiting resistor R7 in series with capacitor C7 to the output of non-inverting clipper 35 at junction 41 formed by Zener diode 38 and isolating resistor R13. The collector of $Q_1$ is coupled to the positive pole of the power supply 42 of recorder 40 through current limiting resistor R8 and its emitter to common circuit 16 as is the negative pole power supply 42. The collector of $Q_2$ is connected to electronic trigger means 43 of recorder 40 and the base thereof to an intermediate point of base biasing resistor R10 with the emitter being connected to common circuit 16. Resistor R10 has one end connected to common circuit 16 and its opposite end to one side of capacitor C13. The opposite side of capacitor C13 is coupled to junction 44 formed by the collector of $Q_1$ and one terminal of current limiting resistor R8 whereby capacitor C13 is charged by power supply 42.

In operation, when the pulse or signal from non-inverting clipper 35 is coupled via capacitor C7 to the base of $Q_1$ biasing $Q_1$ into saturation, its collector goes substantially to ground or common circuit 16 causing capacitor C13 to discharge to ground. However, when the pulse or signal decays to zero, $Q_1$ comes out of saturation and its collector rises above ground whereupon capacitor C13 is charged by power supply 42 resulting in a current flow through resistor R10 whereby $Q_2$ is biased into saturation and its collector goes to ground or common circuit 16. Thus, when the collector of $Q_2$ is at ground, the electronic trigger means 43 to which it is operatively coupled is activated, advancing the magnetic tape of recorder 40 during the decay or trailing edge of the clipped voltage pulse output of non-inverting clipper 35.

While in the embodiment described, the invention has been applied to the recording of data inputs on stationary magnetic tape, it will be evident to those skilled in the art that the invention may also be advantageously used in recording on moving tape. In such an application, the transistor trigger circuit 45 would not be required.

It will also be evident that the charge amplifier 19 and precision rectifier 22 function to convert a charge developed by the piezoelectric accelerometer 18 to a positive voltage pulse input to the shaping circuit 35 and thus comprises signal generating means to produce a unipolar voltage pulse of varying amplitude to be recorded in the magnetic tape of the recording system. Since the shaping circuit 35 is responsible for compensation of the input signal to correlate with the non-linear recording characteristics of the magnetic tape, various other means may be employed within the scope of the invention to provide a unipolar voltage pulse of varying amplitude to the input of the shaping circuit 35.

We claim:

1. A signal conditioner for extending the linear dynamic range of a magnetic tape recording system comprising:

a. a power supply coupled to said conditioner for energizing same;

b. signal generating means to produce a unipolar voltage pulse of varying amplitude which is to be recorded on magnetic tape by said system;

c. an inverting clipper means having its input coupled to the output of said signal generating means whereby a clipped negative going pulse is produced at the output of said inverting clipper;

d. a non-inverting clipper means having its input coupled to the output of said signal generating means whereby a clipped positive going pulse is produced at the output of said non-inverting clipper; and e. a summing amplifier having its inputs coupled to the outputs of said signal generating means, said inverting clipper and said non-inverting clipper for summing said outputs and producing at the output thereof a resultant voltage pulse which is coupled to a magnetic recording head of a recorder producing therein a current that is a non-linear function of the voltage produced by said signal generating means.

2. The invention in accordance with claim 1 wherein said signal generating means comprise:

a. electric charge generating means to produce an electric charge which is to be recorded on said tape, b. charge amplifier means coupled to said electric charge generating means for converting the charge generated thereby to a voltage pulse, and c. precision rectifier means coupled to said voltage pulse operative to produce at its output a positive going pulse that is equivalent to the absolute value of said voltage pulse.

3. The invention in accordance with claim 2 wherein said electric charge generating means comprises a piezoelectric accelerometer affixed to 4. The invention in accordance with claim 2 wherein said precision rectifier means comprises a half-wave rectifier consisting of an operational amplifier with a pair of rectifying diodes connected in opposite conducting directions to each other between the input and output of said operational amplifier, and a summing amplifier having one input coupled to the input of said half-wave rectifier and another input coupled to the output of said charge amplifier means whereby the output of said precision rectifier means is the summed output of said charge amplifier and said half-wave rectifier.

5. The invention in accordance with claim 1 wherein said inverting clipper means comprises an operational amplifier and a Zener diode coupling the output with the input thereof.

6. The invention in accordance with claim 1 wherein said non-inverting clipper means comprises an operational amplifier and a Zener diode coupled across the output thereof.

7. The invention in accordance with claim 1 wherein the magnetic tape of said recorder is stationary when said current is produced in said magnetic recording head and said signal conditioner includes switching means responsive to the output pulse of said non-inverting clipper to activate electronic trigger means in said recorder whereby the magnetic recording tape is advanced during the time of the trailing edge of said output pulse.

8. The invention in accordance with claim 7 wherein said switch means comprises a first transistor having a base capacitively coupled to the output pulse of said non-inverting clipper, an emitter connected to the common circuit of said conditioner and a collector coupled to said common circuit through a potential source, a second transistor having a collector operatively connected to electronic switch means of said recorder, an emitter coupled to said common circuit, and a base coupled to a biasing circuit coupled between the collector of said first transistor and said common circuit, said biasing circuit comprising resistor means to which the base of said second transistor is coupled in series with a capacitor, said first transistor operative during the rise time of said pulse to discharge said capacitor and operative during the decay time of said pulse to permit charging of said capacitor whereby current flows through said biasing circuit causing said second transistor to saturate whereby said trigger means functions to advance the tape of said recorder.

* * * * *